United States Patent
He et al.

(10) Patent No.: US 12,273,152 B2
(45) Date of Patent: Apr. 8, 2025

(54) OBSTACLE RECOGNITION METHOD AND RELATED DEVICE

(71) Applicant: HUAWEI TECHNOLOGIES CO., LTD., GuangDong (CN)

(72) Inventors: Haiyang He, Suzhou (CN); Xiaofei Bai, Suzhou (CN); Jun Zhan, Suzhou (CN); Dong Yang, Nanjing (CN); Qikun Wei, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 426 days.

(21) Appl. No.: 17/845,610

(22) Filed: Jun. 21, 2022

(65) Prior Publication Data

US 2022/0416919 A1 Dec. 29, 2022

(30) Foreign Application Priority Data

Jun. 22, 2021 (CN) .......................... 202110691851.5

(51) Int. Cl.
*H04B 17/318* (2015.01)
*H04W 24/08* (2009.01)
*H04W 88/10* (2009.01)

(52) U.S. Cl.
CPC .......... *H04B 17/318* (2015.01); *H04W 24/08* (2013.01); *H04W 88/10* (2013.01)

(58) Field of Classification Search
CPC .. H04B 17/318; H04B 17/382; H04B 17/391; H04B 17/309; H04W 24/08; H04W 88/10; H04W 24/04; H04W 24/02
See application file for complete search history.

(56) References Cited

U.S. PATENT DOCUMENTS

| | | | |
|---|---|---|---|
| 2006/0069526 A1* | 3/2006 | Kaiser | G01S 5/021 702/150 |
| 2018/0063738 A1 | 3/2018 | Beluri et al. | |
| 2020/0245260 A1 | 7/2020 | Desai et al. | |
| 2022/0272551 A1* | 8/2022 | Tadayon | H04W 36/16 |

FOREIGN PATENT DOCUMENTS

EP    2592433 A1    5/2013

OTHER PUBLICATIONS

Cisco Systems, Inc., "Radio Resource Management White Paper", First Published: Feb. 18, 2016; 52 total pages.

* cited by examiner

*Primary Examiner* — Basil Ma
(74) *Attorney, Agent, or Firm* — Rimon PC

(57) ABSTRACT

An obstacle recognition method and apparatus, and a related device are provided. The method includes: obtaining an actual path loss value between a first AP and a second AP, path loss value pairs between a terminal and a plurality of AP pairs, and path loss values of the plurality of AP pairs; obtaining, based on the path loss value pairs between the terminal and the plurality of AP pairs, an AP pair similar to an AP pair formed by the first AP and the second AP; obtaining a second path loss value between the first AP and the second AP based on a path loss value of the similar AP pair; and comparing the second path loss value between the first AP and the second AP with the actual path loss value, to determine whether an obstacle exists between the first AP and the second AP.

7 Claims, 7 Drawing Sheets

OBSTACLE RECOGNITION METHOD AND RELATED DEVICE

CROSS-REFERENCE TO RELATED APPLICATION

This application claims priority to Chinese Patent Application No. 202110691851.5, filed on Jun. 22, 2021, which is hereby incorporated by reference in its entirety.

TECHNICAL FIELD

The present invention relates to the wireless communications field, and in particular, to an obstacle recognition method and apparatus, and a related device.

BACKGROUND

A terminal device accesses a wireless network by using an access point (AP) device. Generally, there are a plurality of AP devices in an environment, and these AP devices are managed by a wireless controller device. For example, the wireless controller device is an access controller (AC) device. The AC device can configure a power, a channel, and a bandwidth of the AP device by using a radio calibration technology. Therefore, a probability that neighboring AP devices have a same frequency is reduced when channels are available, so as to reduce signal interference between the neighboring AP devices and improve a channel throughput.

The radio calibration technology used by the AC device for managing the AP devices is based on a received signal strength indication (RSSI) obtained through measurement between the AP devices. In an actual wireless local area network application environment, a deployment environment of the AP devices is not necessarily an open environment. There may be an obstacle such as a beam, a pipe, or a wall obstructing the AP devices, which results in an inaccurate RSSI between the AP devices. Therefore, a radio calibration result is affected.

SUMMARY

This application provides an obstacle recognition method and apparatus, and a related device, to determine whether an obstacle exists between APs.

According to a first aspect, an obstacle recognition method is provided. The method includes: comparing a first path loss value with a second path loss value between a first AP and a second AP, to determine whether an obstacle exists between the first AP and the second AP. The first path loss value is a magnitude of a signal loss obtained through measurement between the first AP and the second AP. The second path loss value is a path loss value obtained by inferring based on a path loss value pair between a terminal and each AP pair in a plurality of AP pairs. Each AP pair in the plurality of AP pairs includes two APs. The plurality of AP pairs do not include an AP pair formed by the first AP and the second AP.

The first path loss value is an actual path loss value between the first AP and the second AP, and the second path loss value is an inferred path loss value between the first AP and the second AP. The actual path loss value and the inferred path loss value between the first AP and the second AP are obtained, where the inferred path loss value is obtained based on a path loss value of another AP pair. Whether an obstacle exists between the first AP and the second AP may be determined by comparing the actual path loss value and the inferred path loss value. Determining whether an obstacle exists between AP devices improves accuracy of radio calibration.

With reference to the first aspect, in some implementations, before the comparing a first path loss value with a second path loss value between a first AP and a second AP, the method further includes: obtaining a similar AP pair based on a similarity between a target path loss value pair and the path loss value pair that is between the terminal and each AP pair in the plurality of AP pairs, where the target path loss value pair includes: a path loss value between a first terminal and the first AP, and a path loss value between the first terminal and the second AP; for each AP pair in the plurality of AP pairs, the path loss value pair between the terminal and the AP pair includes: a path loss value between a second terminal and one AP in the AP pair, and a path loss value between the second terminal and the other AP in the AP pair; and the similar AP pair is an AP pair whose path loss value pair has a high similarity with the target path loss value pair in the plurality of AP pairs; and obtaining the second path loss value based on a path loss value between two APs of the similar AP pair. The first terminal and the second terminal may be different terminals, or may be a same terminal.

By calculating the similarity between a path loss value pair of the first AP and the second AP and a path loss value pair of another AP pair, an AP pair whose path loss value pair has a high similarity with the path loss value pair of the first AP and the second AP may be obtained. Similarities between path loss value pairs of all remaining AP pairs and the path loss value pair of the first AP and the second AP may be ranked, and top-ranked AP pairs are selected as similar AP pairs. In some implementations, the similar AP pair may also be obtained by comparing the similarity with a similarity threshold. For example, an AP pair whose similarity is greater than the similarity threshold is used as the similar AP pair. In addition, the similarity between the target path loss value pair and the path loss value pair between the terminal and each AP pair in the plurality of AP pairs may be obtained by calculating any one of a cosine distance, a Euclidean Distance, a Manhattan Distance, a Chebyshev Distance, and a Minkowski Distance. Finally, a path loss value of the similar AP pair is used as the inferred path loss value between the first AP and the second AP. If there are the plurality of similar AP pairs, an average or a most frequent value of path loss values of the plurality of similar AP pairs is used as the inferred path loss value between the first AP and the second AP. Further, the AP pair similar to the first AP and the second AP may be obtained based on path loss value pairs between the AP pairs and the terminal, and a path loss value between the first AP and the second AP is inferred based on the path loss value of the similar AP pair.

With reference to the first aspect, in some implementations, the comparing a first path loss value with a second path loss value between a first AP and a second AP, to determine whether an obstacle exists between the first AP and the second AP includes: if the second path loss value is less than the first path loss value, and a difference between the second path loss value and the first path loss value is greater than a threshold, determining that an obstacle exists between the first AP and the second AP.

When the inferred path loss value is less than the actual path loss value, and the difference is large, it is considered that the actual path loss value between the first AP and the second AP is large. In other words, an obstacle exists between the first AP and the second AP.

With reference to the first aspect, in some implementations, before the comparing a first path loss value with a second path loss value between a first AP and a second AP, the method further includes: comparing a transmission power of the first AP with a signal strength of the first AP measured by the second AP, to obtain the first path loss value.

The actual path loss value between the first AP and the second AP is obtained by performing division on the power of the first AP and the strength of the signal received between the first AP and the second AP, or by performing subtraction on a logarithm of the power of the first AP and a logarithm of the strength of the signal received between the first AP and the second AP. The strength of the signal received between the first AP and the second AP may be a received signal strength indication RSSI value, and each RSSI value corresponds to a power value. In other words, the actual path loss value is a result obtained by dividing the power of the first AP by the power value corresponding to the RSSI.

According to a second aspect, an obstacle recognition apparatus is provided in this application. The obstacle recognition apparatus includes a determining unit. The determining unit is configured to compare a first path loss value with a second path loss value between a first AP and a second AP, to determine whether an obstacle exists between the first AP and the second AP. The first path loss value is a magnitude of a signal loss obtained through measurement between the first AP and the second AP. The second path loss value is a path loss value obtained by inferring based on a path loss value pair between a terminal and each AP pair in a plurality of AP pairs. Each AP pair in the plurality of AP pairs includes two APs. The plurality of AP pairs do not include an AP pair formed by the first AP and the second AP.

With reference to the second aspect, in some implementations, the determining unit is further configured to obtain a similar AP pair based on a similarity between a target path loss value pair and the path loss value pair that is between the terminal and each AP pair in the plurality of AP pairs. The target path loss value pair includes: a path loss value between a first terminal and the first AP, and a path loss value between the first terminal and the second AP. For each AP pair in the plurality of AP pairs, the path loss value pair between the terminal and the AP pair includes: a path loss value between a second terminal and one AP in the AP pair, and a path loss value between the second terminal and the other AP in the AP pair. The similar AP pair is an AP pair whose path loss value pair has a high similarity with the target path loss value pair in the plurality of AP pairs. The determining unit is further configured to obtain the second path loss value based on a path loss value between two APs of the similar AP pair.

With reference to the second aspect, in some implementations, the determining unit is further configured to: when the second path loss value is less than the first path loss value, and a difference between the second path loss value and the first path loss value is greater than a threshold, determine that an obstacle exists between the first AP and the second AP.

With reference to the second aspect, in some implementations, the obstacle recognition apparatus further includes a generation unit, where the generation unit is configured to compare a transmit power of the first AP with a strength of a signal of the first AP measured by the second AP, to obtain the first path loss value.

According to a third aspect, this application provides a computing device, including a processor and a memory, where the memory is configured to store instructions, and the processor is configured to execute the instructions. When executing the instructions, the processor performs the method described in the first aspect.

According to a fourth aspect, this application provides a computer-readable storage medium, where the computer-readable storage medium stores instructions. When the instructions are run on a computing device, the method described in the first aspect is performed.

According to a fifth aspect, this application provides a computer program product, where the computer program product includes computer instructions. When the computer program product is run on a computing device, the computing device performs the method described in the first aspect.

In conclusion, according to the obstacle recognition method and apparatus, and the related device provided in this application, whether an obstacle exists between the first AP and the second AP is determined by comparing the actual path loss value with the second path loss value between the first AP and the second AP. Based on a result about whether an obstacle exists between the first AP and the second AP, accuracy of radio calibration can be improved.

BRIEF DESCRIPTION OF DRAWINGS

To describe technical solutions in embodiments of this application more clearly, the following briefly describes accompanying drawings used in describing the embodiments.

DESCRIPTION OF EMBODIMENTS

Figure 1:
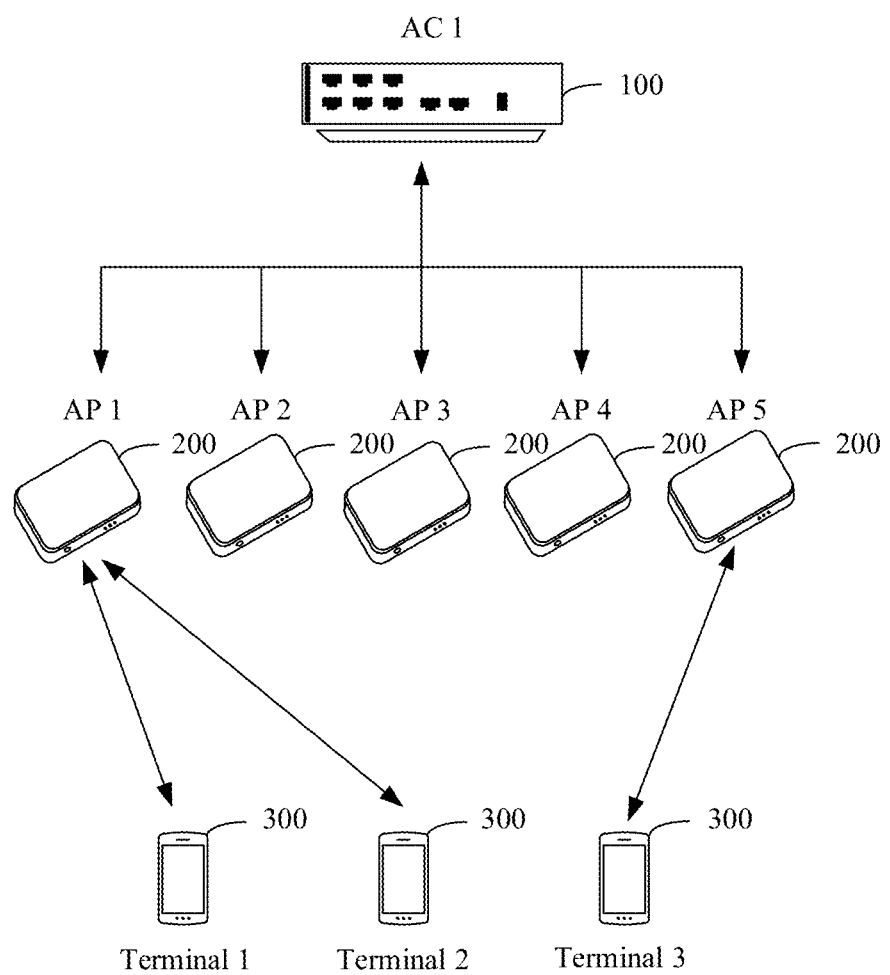
FIG. 1 is a schematic diagram of a WLAN communications system in an application scenario according to an embodiment of this application.

First, a wireless local area network (WLAN) in embodiments of this application is described. As shown in FIG. 1, a WLAN communications system 10 may include an AC device 100, an AP device 200, and a terminal device 300. The AC device 100 is connected to the AP device 200, and the AP device 200 is connected to the terminal device 300.

The AC device 100 is configured to manage AP devices 200 in a centralized manner. The AC device 100 may manage one or more AP devices 200. As shown in FIG. 1, an AC 1 manages an AP 1, an AP 2, an AP 3, an AP 4, and an AP 5. As shown in an upper part of FIG. 2, the AC device 100 includes a memory 101, a processor 102, and a network interface 103. The memory 101 stores configuration information of the AP device 200, including information such as a power and a bandwidth. The processor 102 is configured to complete control functions of the AP device 200, such as configuration management, authentication and management of a wireless user, and broadband access and security. The network interface 103 is configured to aggregate data of the AP device 200 and provide a wired network for the AP device 200. The following describes how the processor 102 performs configuration management on the AP device 200 by way of example. When an overlapping frequency band exists on working channels of neighboring AP devices 200, an excessively large power of the AP device 200 causes signal interference to the neighboring AP device. The AC device 100 dynamically adjusts parameters such as a channel, a power, and a bandwidth of the AP device 200 by using a radio calibration technology, so as to reduce the interference between the AP devices 200 managed by the AC device 100, and ensure that the AP devices 200 work in an optimal state.

The AP device 200 has a bridging function, bridging a wired signal (for example, a broadband network signal) and a wireless signal (for example, a WLAN signal). The AP device 200 is configured to provide a wireless network in the WLAN for access of the terminal device 300. The AP device 200 may access a plurality of terminal devices 300. As shown in a middle part of FIG. 2, the AP device 200 includes a network interface 201, a processor 202, a memory 203, and an antenna 204. The network interface 201 is used by the AP device 200 to obtain the wired network from the AC device 100. The processor 202 is configured to manage an accessed terminal device 300. The memory 203 is configured to store information about the terminal device 300 accessing the AP device 200 and information about another AP device 200 managed by the same AC device 100. The antenna 204 is configured to transmit and receive electromagnetic waves, so that the terminal device 300 accesses the wireless network, and the terminal device 300 communicates with a network and another device. In addition, the antenna 204 may further enable the AP devices 200 to communicate with each other.

The terminal device 300 is configured to communicate with a network and another device by using the wireless network provided by the AP device 200. Before using the wireless network provided by the AP device 200, the terminal device 300 may select an appropriate AP device 200 for access among the AP devices 200. The terminal device 300 may be specifically a mobile device such as a mobile phone, a notebook computer, or a tablet computer, or may be a smart home device such as a display screen, a sound box, an air conditioner, a washing machine, a desk lamp, or an intelligent lock, or another handheld device or computing device that has a wireless communication function. As shown in a lower part of FIG. 2, the terminal device 300 includes: an antenna 301, a wireless communications module 302, and a processor 303. The antenna 301 is configured to detect the wireless network of the AP device 200. When the terminal device 300 needs to use the wireless network, the antenna 301 receives an electromagnetic wave sent by the AP device 200. The wireless communications module 302 is configured to perform frequency modulation and filtering on an electromagnetic wave signal received by the antenna 301, and send a processed signal to the processor 303 of the terminal device 300. The processor 303 is configured to communicate with a network and another device by using the signal processed by the wireless communications module 302. In FIG. 1, an example in which a terminal 1, a terminal 2, and a terminal 3 are mobile phones is used for description. The terminal 1, the terminal 2, and the terminal 3 may select appropriate APs to access an Ethernet. The terminal 1 and the terminal 2 access the AP 1, and the terminal 3 accesses the AP 5.

In a same wireless local area network, the AC device 100 manages the AP devices 200 by using the radio calibration technology, so that the AP devices 200 work well, and the terminal device 300 may select a close AP device 200 or an AP device 200 that has a strong signal to access. The radio calibration technology needs to obtain an RSSI between the AP devices 200 and powers of the AP devices 200, to obtain a path loss value set of the AP devices 200. Each RSSI value corresponds to a power value. For example, a path loss value of the AP 1 relative to the AP 2 may be obtained by performing division on a power of the AP 1 and a power value corresponding to an RSSI between the AP 1 and the AP 2, or may be obtained by performing subtraction on a logarithm of the power of the AP 1 and a logarithm of a power value corresponding to the RSSI between the AP 1 and the AP 2. Then, based on the path loss value set, the power, the channel, and the bandwidth of the AP device 200 are configured by using a radio resource manage (RRM) algorithm such as a power calibration algorithm or a channel allocation algorithm, so that a same frequency of the neighboring AP devices is reduced when the channels are available. In this way, the interference of the neighboring AP device 200 is reduced, and a channel throughput is improved.

That is, the RRM algorithm used by the AC device 100 to manage the AP devices 200 is based on the RSSI data between the AP devices 200, and the RSSI data is obtained by mutual measurement of the AP devices 200. It should be understood that, the RSSI data between the AP devices 200 is obtained based on a strength of an electromagnetic wave signal that is received by one AP device 200 and sent by another AP device 200.

Figure 3:
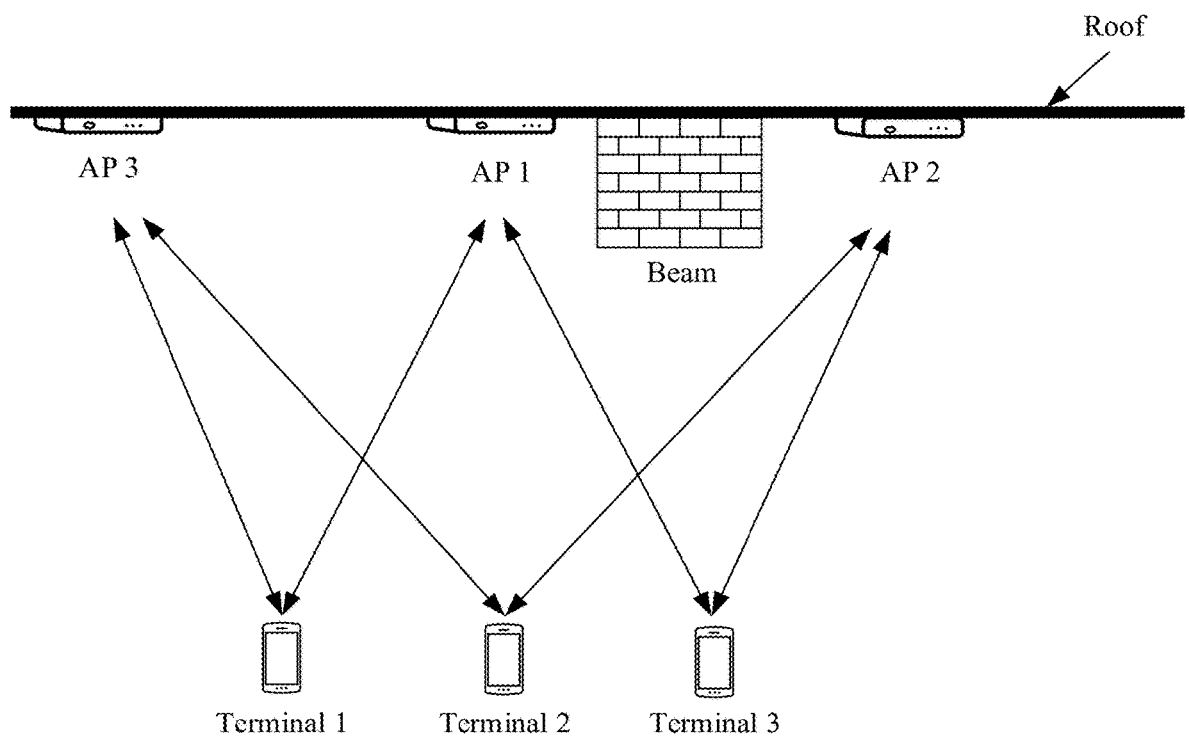
FIG. 3 is a schematic diagram of an AP device deployment scenario according to an embodiment of this application.
Figure 4:
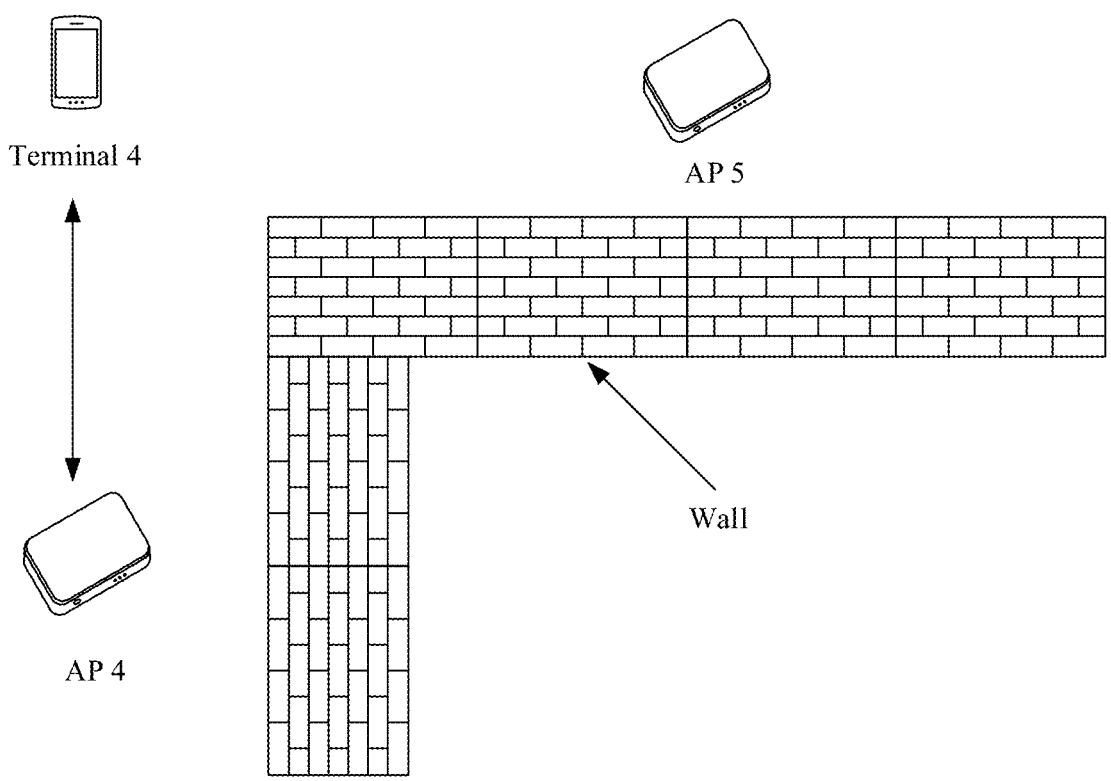
FIG. 4 is a schematic diagram of another AP device deployment scenario according to an embodiment of this application.

However, in an actual wireless local area network application environment, a deployment environment of the AP devices 200 is not necessarily an open environment. There may be an obstacle such as a beam, a pipe, or a wall between the AP devices 200 in the actual employment environment, which results in an excessively large path loss value between the AP devices 200 and inaccuracy of input data of the RRM algorithm. Therefore, a radio calibration result is affected. For example, as shown in FIG. 3, the AP 1 and the AP 2 are obstructed by a beam. Measurement of the RSSI data between the AP 1 and the AP 2 is affected because of the beam. As a result, the RSSI data between the AP 1 and the AP 2 is excessively small, and an obtained path loss value between the AP 1 and the AP 2 is excessively large. As shown in FIG. 4, the AP 4 and the AP 5 are obstructed by a corner of a wall. As a result, RSSI data between the AP 4 and the AP 5 is excessively small, and an obtained path loss value between the AP 4 and the AP 5 is excessively large.

To resolve the problem that the radio calibration result is affected because of inaccuracy of the obtained RSSI data, which is caused by the obstacle between the foregoing AP devices, this application provides an obstacle recognition method, to effectively determine whether an obstacle exists between AP devices, to perform radio calibration more accurately.

An obstacle recognition method is provided in this application, and is applied to an AC device or a computing device. An application scenario in which a plurality of AP devices provide a wireless network is used as an example for description. As shown in FIG. 3, the AP 1, the AP 2, and the AP 3 provide the wireless network, and there are the terminal 1, the terminal 2, and the terminal 3. To confirm a to-be-measured AP pair, that is, to confirm whether an obstacle exists between the AP 1 and the AP 2, test personnel may carry the terminal 1 and measures a signal strength of each AP device by using the terminal 1 from different locations, to obtain a path loss value pair between the terminal and each AP pair. Alternatively, each terminal may measure a signal strength between the terminal and each AP device, to obtain a path loss value pair between the terminal and each AP pair. For example, a path loss value pair between the AP 1 and the AP 3 is obtained by using the terminal 1, a path loss value pair between the AP 2 and the AP 3 is obtained by using the terminal 2, and a path loss value pair between the AP 1 and the AP 2 is obtained by using the terminal 3. The recognition device finds, based on the path loss value pairs between the terminals and the AP pairs, that an AP pair similar to the to-be-measured AP pair includes AP 1 and AP 3, where a path loss value between the terminal 1 and each of the AP 2 and the AP 3 is similar to a path loss value between the terminal 3 and each of the AP 1 and the AP 2. It may be considered that a path loss value between the AP 1 and the AP 2 should also be similar to a path loss value between the AP 1 and the AP 3. However, a comparison result obtained by the recognition device is that a difference between an actual path loss value between the AP 1 and the AP 2 and the path loss value between the AP 1 and the AP 3 is large. Then, it can be determined that an obstacle exists between the AP 1 and the AP 2. The result that an obstacle exists between the AP 1 and the AP 2 is used by the recognition device for radio calibration. In this way, a radio calibration result can be accurate.

Figure 5:
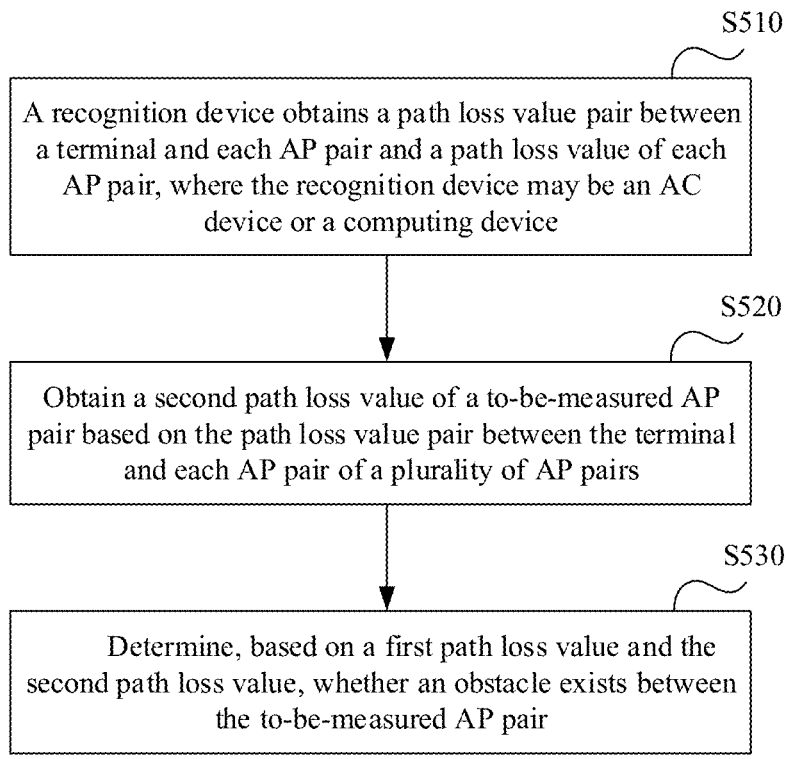
FIG. 5 is a schematic flowchart of an obstacle recognition method according to an embodiment of this application.

The following describes in detail an obstacle recognition method provided in this application. A first AP and a second AP are a to-be-measured AP pair. As shown in FIG. 5, the obstacle recognition method may include the following steps.

S510. A recognition device obtains a path loss value pair between a terminal and each AP pair and a path loss value of each AP pair, where the recognition device may be an AC device or a computing device.

The terminal is under wireless network coverage of a plurality of AP devices. The plurality of AP devices include the first AP and the second AP. The AP devices mutually form a plurality of AP pairs. For example, the first AP and the second AP form an AP pair, the first AP and a third AP form an AP pair, and the second AP and the third AP form an AP pair. The terminal measures a signal strength of each AP device, to obtain a path loss value between the terminal and each AP device. The AP devices also measure each other to obtain path loss values of all AP pairs. The recognition device obtains the path loss value between the terminal and each AP device obtained through measurement and the path loss values obtained by mutual measurement of the plurality of AP pairs. The recognition device obtains path loss value pairs of the plurality of AP pairs based on the path loss value between the terminal and each AP device, where a path loss value of the to-be-measured AP pair may be referred to as a first path loss value, and a path loss value pair between the terminal and the to-be-measured AP pair is a target path loss value pair.

When the terminal measures the signal strength of each AP device and obtains the path loss value between the terminal and each AP device, a path loss value preset range may be set, and the recognition device obtains only a path loss value between the terminal and each AP device within a same preset range. If there is only one terminal or a quantity of terminals is small, a location of the terminal may be moved until path loss values between the terminal and two AP devices in an AP pair are within the preset range. In this case, the path loss values between the current terminal and the two AP devices are obtained, to obtain a path loss value pair of the AP pair. Then, the location of the terminal is moved again until path loss values between the terminal and two AP devices in another AP pair are within the preset range, to obtain a path loss value pair of the AP pair. The location of the terminal is moved until path loss value pairs between the terminal and all the AP pairs are obtained.

If there are a plurality of terminals in a current scenario, terminals at different locations may measure the signal strength of each AP device, to obtain path loss values between the terminals and the AP devices. Among all the path loss values obtained through measurement performed by the terminals, a path loss value pair in which path loss values between a terminal and two AP devices in an AP pair are within the preset range is selected. Then, the path loss value pairs between the terminals and each AP pair are obtained. For example, if there are a first terminal and a second terminal currently, a path loss value between the first terminal and an AP device that is in an AP pair is not within the preset range, but path loss values between the second terminal and the two AP devices that are in the AP pair are both within the preset range, the recognition device selects a path loss value pair between the second terminal and the AP pair as a path loss value pair of the AP pair.

The following describes in detail the obtaining a path loss value pair between a terminal and each AP pair and path loss values of each AP pair.

Specifically, the AC device includes NAP devices in total, where N is a positive integer. The recognition device determines M AP devices in the N AP devices, where M≤N, and M is a positive integer. The M AP devices include a first AP, and another AP device is a neighbor of the first AP. M(M−1)/2 AP pairs can be generated between any two of the M AP devices. First, the recognition device obtains powers of the M AP devices and a signal strength obtained through measurement between the terminal and each AP device, to further obtain path loss value pairs between the terminal and the M(M−1)/2 AP pairs. Then, the recognition device obtains signal strengths obtained through mutual measurement between the AP devices, to obtain path loss values of the M(M−1)/2 AP pairs. The recognition device may be an AC device or another electronic device having a computing function, and a strength of a measured signal is an RSSI.

In a specific embodiment, the determining M AP devices in the N AP devices specifically includes: determining the M AP devices in the N AP devices, where the MAP devices include the first AP, and the remaining M−1 AP devices may be M−1 AP devices that are closest to the first AP, or may be M−1 AP devices with strongest signals that can be received by the first AP. It should be understood that selection of the M−1 AP devices is not specifically limited in this application.

With reference to specific embodiments, the following describes the obtaining path loss value pairs between the terminal and the M(M−1)/2 AP pairs in detail. Powers $\{P_1, P_2, \ldots, P_M\}$ of the M AP devices are obtained from the AC device, the M AP devices separately send detection signals, and the terminal generates RSSIs between the terminal and the M AP devices based on strengths of the received signals. Each RSSI value corresponds to a power value $\{R_1, R_2, \ldots, R_M\}$. Path loss values $\{L_1, L_2, \ldots, L_M\}$ between the terminal and the M AP devices are obtained based on the RSSIs between the terminal and the M AP devices. A formula for calculating a path loss between the terminal and the $i^{th}$ AP device is shown in Formula (1), where i≤M and i is a positive integer:

$$L_i = P_i / R_i \qquad (1)$$

Then, based on the path loss values $\{L_1, L_2, \ldots, L_M\}$ between the terminal and the M AP devices, path loss value pairs $\{X_{1,2}, X_{1,3}, \ldots, X_{M-1,M}\}$ between the terminal and the M(M−1)/2 AP pairs are obtained, where $X_{1,2}$ is $[L_1, L_2]$, $X_{1,3}$ is $[L_1, L_3]$, and by analogy, $X_{M-1,M}$ is $[L_{M-1}, L_M]$.

In some embodiments, because the terminal is movable in the application scenario, the RSSIs between the terminal and the AP devices are different when the terminal is at different locations, and therefore the path loss values between the terminal and the AP devices are different when the terminal is at the different locations. A range and the location of the terminal may be preset, so that path loss values between the terminal and two AP devices in an AP pair are both within the preset range. For example, if the range of the path loss values between the terminal and the AP devices is [0, 150], the preset range may be set to [60, 90], and the terminal is moved, so that the path loss values between the terminal and the AP devices are between [60, 90].

To be specific, in the process of obtaining the path loss value pairs between the terminal and the M(M−1)/2 AP pairs, after a path loss value pair between the terminal and an AP pair is obtained, the terminal is moved again, where a path loss value between the terminal and each AP in the AP pair is within the preset range. In this way, a path loss value between the terminal and each AP in another AP pair is also within the preset range, and a current path loss value pair between the terminal and the other AP pair is obtained. It should be understood that, in a process of generating path loss value pairs between the terminal and the M−1 AP pairs, path loss values between the terminal and two APs in an AP pair need to correspond to a same location of the terminal. It is assumed that the path loss value pairs between the terminal and the M(M−1)/2 AP pairs obtained based on the RSSI data are $\{X_{1,2}', X_{1,3}', \ldots, X_{M-1,M}'\}$, where $X_1$ is $[L_1^1, L_2^2]$, and $X_2$ is $[L_1^2, L_3]$. An AP pair formed by the AP 1 and another AP is used as an example. $\{L_1^1, L_2, \ldots, L_1^{M-1}\}$ are path loss values between the terminal and the AP 1 when the terminal is at different locations. However, $L_1^1$ and $L_2$ are obtained through measurement by the terminal at a same location, and similarly, $L_1^2$ and $L_3$ are also obtained through measurement by the terminal at a same location. By analogy, $L_1^i$ and $L_{i+1}$ are obtained through measurement by the terminal at a same location, and $L_1^{M-1}$ and $L_M$ are obtained through measurement by the terminal at a same location.

In some embodiments, there are a plurality of terminals in the application environment. Path loss values between the terminals and the plurality of AP pairs may be obtained by using the terminals at different locations, so that path loss values between the terminals at different locations and each AP device may be obtained. Then, selection is performed on the path loss values between all the terminals and the AP devices, so that ranges of the path loss values between the terminals and the AP devices are within the preset range. For example, if there are a terminal 1 and a terminal 2 currently, a path loss value between the terminal 1 and an AP device that is in an AP pair is not within the preset range, but path loss values between the terminal 2 and two AP devices that are in the AP pair are both within the preset range, the recognition device selects a path loss value pair between the terminal 2 and the AP pair as a path loss value pair of the AP pair. If not all path loss value pairs of the AP pairs can be obtained by using the plurality of terminals in the current application environment, where path loss values in the path loss value pairs are within the preset range, some terminals may be moved, so that path loss values between the terminal and two AP devices in an AP pair of which a path loss value pair is not obtained are within the preset range, and the path loss value pair that is of the remaining AP pair and that is not obtained can be further obtained.

With reference to specific embodiments, the following describes the obtaining path loss values of the M(M−1)/2 AP pairs in detail. An AP device sends a detection signal, and other AP devices generate RSSI data based on a strength of a received signal. Based on the RSSI data and a power of the AP device that sends the signals, the path loss values $\{L_{1,2}, L_{1,3}, \ldots, L_{M-1,M}\}$ between the AP devices are obtained. The AP 1 is used as an example. The AP 1 sends a detection signal, and other AP devices generate RSSI data based on a strength of a received signal, to obtain the powers $\{R_{1,2}, R_{1,3}, \ldots, R_{1,M}\}$ corresponding to RSSIs between the AP 1 and other AP devices, where the $R_{1,2}$ indicates a power value corresponding to an RSSI between the AP 1 and the AP 2, and so on. Then, the powers $\{P_1, P_2, \ldots, P_M\}$ of the M AP devices are obtained from the AC device, and based on $\{P_1, P_2, \ldots, P_M\}$ and $\{R_{1,1}, R_{1,2}, \ldots, R_{1,M}\}$, the path loss values $\{L_{1,2}, L_{1,3}, \ldots, L_{1,M}\}$ between the AP 1 and other AP devices are further obtained, where $L_{1,2}$ represents a path loss value between the AP 1 and an AP 2, and so on. For a specific calculation method, refer to the foregoing formula 1. For example, the path loss value $L_{1,2}$ between the AP 1 and the AP 2 is equal to a value obtained by subtracting the power $R_{1,1}$ corresponding to an RSSI between the AP 1 and the AP 2 from the power $P_1$ of the AP 1.

In conclusion, in the obstacle recognition method provided in this application, the path loss value pairs $\{X_{1,2}, X_{1,3}, \ldots, X_{M-1,M}\}$ between the terminal and the M(M−1)/2 AP pairs and the path loss values $\{L_{1,2}, L_{1,3}, \ldots, L_{M-1,M}\}$ between the AP devices are obtained by using the terminal and the AP devices.

S520. Obtain a second path loss value of the to-be-measured AP pair based on the path loss value pair between the terminal and each AP pair of the plurality of AP pairs.

The recognition device calculates similarities between the target path loss value pair and path loss value pairs of other AP pairs, and a similar AP pair of the to-be-measured AP pair may be found. Because path loss values between two AP devices in the similar AP pair and the terminal are similar to path loss values between the two AP devices in the to-be-measured AP pair and the terminal, it may be considered that a path loss relationship among the two AP devices in the similar AP pair and the terminal is similar to a path loss relationship among the two AP devices in the to-be-measured AP pair and the terminal. In this case, a path loss value of the similar AP pair may be used as an inferred path loss value of the to-be-measured AP pair, and the inferred path loss value may also be referred to as the second path loss value. If a plurality of similar AP pairs are obtained, the inferred path loss value of the to-be-measured AP pair may be obtained based on an average or a most frequent value of path loss values of the similar AP pairs.

Specifically, first, distances between the target path loss value pair and path loss value pairs that are between the terminal and the other AP pairs are separately calculated, where the target path loss value pair is the path loss value pair between the terminal and the to-be-measured pair, and therefore distances between M(M−1)/2−1 AP pairs and the to-be-measured AP pair are obtained. Then, K AP pairs are selected from the M(M−1)/2−1 AP pairs based on the distances. The second path loss value of the to-be-measured AP pair is obtained based on path loss values of the K AP pairs, where the second path loss value may be an average or a most frequent value of the path loss values of the K AP pairs, and the most frequent value is determined based on a frequency of the path loss values of the KAP pairs.

In a specific embodiment, the calculating distances between the target path loss value pair and path loss value pairs that are between the terminal and the other AP pairs specifically includes: The distances between the target path loss value pair and the path loss value pairs that are between the terminal and the other AP pairs may be cosine distances, Euclidean Distances, Manhattan Distances, Chebyshev Distances, Minkowski Distances, and the like. A distance calculation method is not specifically limited in this application.

For example, a distance (cosine distance) formula $DIS_u$ for calculating the distances between the target path loss value pair B and the path loss value pairs $A_u$ that are between the terminal and the other AP pairs may be:

$$DIS_u = 1 - \frac{A_u \cdot B}{\|A_u\|\|B\|}, u = 1, 2, \ldots, M-2 \qquad (2)$$

It should be understood that the foregoing formula (2) is merely used as an example for description, and does not constitute a specific limitation.

In a specific embodiment, the selecting K AP pairs from the M(M−1)/2−1 AP pairs based on the distances specifically includes: ranking distances between path loss value pairs of the M(M−1)/2−1 AP pairs and the path loss value pair of the to-be-measured AP pair; and selecting the K AP pairs closest to the to-be-measured AP pair. Alternatively, the K AP pairs are AP pairs that are in the M(M−1)/2−1 AP pairs and whose distances from the to-be-measured AP pair are greater than a threshold β.

In a specific embodiment, when the second path loss value is the frequency value of the path loss values of the K AP pairs, the obtaining the second path loss value of the to-be-measured AP pair based on path loss values of the K AP pairs specifically includes: obtaining a path loss value that appears most frequently in the path loss values of the KAP pairs; and using the path loss value as the second path loss value of the to-be-measured AP pair. In some embodiments, when the second path loss value is the most frequent value of the path loss values of the K AP pairs, the path loss values of the K AP pairs may be further grouped, and a group distance between groups is r. A group value of a group with the most frequencies is used as the most frequent value, that is, the second path loss value of the to-be-measured AP pair. In some other embodiments, after the path loss values of the K AP pairs are grouped, the most frequent value may be calculated by using a W. I. King interpolation method, as shown in formula (3):

$$PL = L + \frac{f_b}{f_a + f_b} * r \text{ or } PL = U - \frac{f_b}{f_a + f_b} * r; \qquad (3)$$

where

PL is the most frequent value, that is, the second path loss value of the to-be-measured AP pair; L is a real lower limit of a group in which the most frequent value is located; U is a real upper limit of the group in which the most frequent value is located; $f_a$ is a frequency adjacent to a lower limit of the group in which the most frequent value is located; $f_b$ is a frequency adjacent to an upper limit of the group in which the most frequent value is located; and r is the group distance.

With reference to a specific embodiment, the following describes: the calculating distances between the target path loss value pair and path loss value pairs that are between the terminal and the other AP pairs, to obtain distances between M(M−1)/2−1 AP pairs and the to-be-measured AP pair; the selecting the K AP pairs closest to the to-be-measured AP pair from the M(M−1)/2−1 AP pairs; and the obtaining the second path loss value of the to-be-measured AP pair based on path loss values of the K AP pairs. In the following embodiment, an example in which the second path loss value of the to-be-measured AP pair is the average of the path loss values of the K AP pairs is used for description.

For example, the AP 1 and AP 2 are used as the to-be-measured AP pair. According to the foregoing formula (2), cosine distances between $X_1$ and $\{X_2, X_3, \ldots, X_{M(M−1)/2}\}$ are respectively calculated, and the distances between $X_1$ and $\{X_2, X_3, \ldots, X_{M(M−1)/2}\}$ are obtained respectively, which are $\{DIS_{1,2}, DIS_{1,3}, \ldots, DIS_{1,M(M−1)}\}$. $\{DIS_{1,2}, DIS_{1,3}, \ldots, DIS_{1,M(M−1)}\}$ are ranked. The K AP pairs closest to the to-be-measured AP pair are selected. For example, K is 3, and three path loss value pairs closest to the target path loss value pair are $X_2, X_3$, and $X_4$. That is, corresponding AP pairs are AP 1 and AP 3, AP 1 and AP 4, and AP 1 and AP 5. Path loss values of the foregoing three AP pairs are $L_{1,3}$, $L_{1,4}$, and $L_{1,5}$ respectively. An average PL of $L_{1,3}$, $L_{1,4}$, and $L_{1,5}$ is calculated, where the average PL is the second path loss value of the to-be-measured AP pair.

In some embodiments, in S510, only the path loss value pairs between the terminal and the M(M−1)/2 AP pairs are obtained, and the path loss values of the M(M−1)/2 AP pairs are not obtained temporarily. In S520, when an AP pair is determined as the to-be-measured AP pair, after the closest K AP pairs are obtained, the path loss value of the to-be-measured AP pair and the path loss values of the foregoing K AP pairs are obtained.

In conclusion, in the obstacle recognition method provided in this application, based on the path loss value pairs $\{X_{1,2}, X_{1,3}, \ldots, X_{M-1,M}\}$ between the terminal and the M(M−1)/2 AP pairs, the AP pair whose path loss value pair is similar to the path loss value pair of the to-be-measured AP pair is found in the M(M−1)/2 AP pairs, and the second path loss value of the to-be-measured AP pair is obtained based on the path loss value of the similar AP pair.

S530. Determine, based on the first path loss value and the second path loss value, whether an obstacle exists between the to-be-measured AP pair.

The path loss relationship among the two AP devices in the similar AP pair and the terminal is similar to the path loss relationship among the two AP devices in the to-be-measured AP pair and the terminal. In this case, an actual path loss value of the to-be-measured AP pair should be close to an actual path loss value of the similar AP pair. Therefore, the recognition device may determine, by comparing the first path loss value with the second path loss value, whether an obstacle exists between the to-be-measured AP pair. If the second path loss value is less than the first path loss value, and a difference between the second path loss value and the first path loss value is greater than a threshold, an obstacle exists between the to-be-measured AP pair. If the second path loss value is greater than or equal to the first path loss value, no obstacle exists between the to-be-measured AP pair. If the second path loss value is less than the first path loss value, but the difference between the second path loss value and the first path loss value is less than the threshold, no obstacle exists between the to-be-measured AP pair. The threshold is specified according to a value range of the path loss values of the AP pairs.

In a specific embodiment, the determining whether an obstacle exists between the to-be-measured AP pair specifically includes: The second path loss value of the to-be-measured AP pair is PL, the actual path loss value of the to-be-measured AP pair is $R_{1,2}$, and the specified threshold is $\delta$. If $R_{1,2}$ is greater than PL, and $R_{1,2}-PL \geq \delta$, an obstacle exists between the to-be-measured AP pair. If $R_{1,2}$ is less than PL, no obstacle exists between the to-be-measured AP pair. If $R_{1,2}$ is greater than PL, and $R_{1,2}-PL < \delta$, no obstacle exists between the to-be-measured AP pair. If the value range of the path loss values of the AP pairs is [0, 150], a value of the threshold $\delta$ usually is 5.

A determining result of whether an obstacle exists between the AP 1 and another AP can be obtained according to the method in the foregoing S510 to S530. In some embodiments, S520 and S530 may be performed for M−1 times. Each time the steps are performed, AP pairs that are formed by the AP 1 and different APs are used as to-be-measured AP pairs. After S520 and S530 are performed for M−1 times, determining results about whether obstacles exist between the AP 1 and remaining M−1 APs can be respectively obtained. In other words, when the foregoing S510 to S530 are performed for M−1 times, the AP 1 in the to-be-measured APs is a same AP. A specific implementation process is described below in detail by using an example.

For example, the path loss value pairs between the terminal and the M(M−1)/2 AP pairs and the path loss values of the M(M−1)/2 AP pairs are first obtained. The AP 1 and the AP 2 are used as the to-be-measured APs, and the second path loss value of the to-be-measured AP pair is obtained, to determine whether an obstacle exists between the AP 1 and the AP 2. The AP 1 and the AP 3 are used as the to-be-measured APs, and the second path loss value of the to-be-measured AP pair is obtained, to determine whether an obstacle exists between the AP 1 and the AP 3. By analogy, the AP 1 and an AP t are used as the to-be-measured APs, where t≤M−1 and t is a positive integer. The second path loss value of the to-be-measured AP pair is obtained, to determine whether an obstacle exists between the AP 1 and the AP t. Finally, the AP 1 and an AP M−1 are used as the to-be-measured APs, and the second path loss value of the to-be-measured AP pair is obtained, to determine whether an obstacle exists between the AP 1 and the AP M−1. Eventually, the determining results about whether obstacles exist between the AP 1 and the remaining M−1 APs may be obtained.

In some other embodiments, after S520 and S530 are performed for M−1 times, and the determining results about whether obstacles exist between the M−1 APs are obtained, the foregoing S510 to S530 are further performed for M−1 times, results about whether obstacles exist between the M APs and the remaining M−1 APs are obtained. A specific implementation process is described below in detail by using an example.

The following describes this embodiment by using an example with reference to Table 1.

TABLE 1

|  | AP 1 | AP2 | ... | AP Q | ... | AP M | Time |
|---|---|---|---|---|---|---|---|
| AP 1 | \ | (AP 1, AP 2) | ... | (AP 1, AP Q) | ... | (AP 1, AP M) | M-1 |
| AP 2 | \ | \ | ... | (AP 2, AP Q) | ... | (AP 2, AP M) | M-2 |
| ... | \ | \ | \ | ... | ... | ... | ... |
| AP Q | \ | \ | \ | \ | ... | (AP Q, AP M) | M-Q |
| ... | \ | \ | \ | \ | ... | ... | ... |
| AP M-1 | \ | \ | \ | \ | \ | (AP M-1, AP M) | 1 |
| AP M | \ | \ | \ | \ | \ | \ | 0 |

When the foregoing S510 to S530 are performed for the first time, the to-be-measured AP pairs are the M−1 AP pairs formed by the AP 1 and the remaining M−1 APs. The determining results about whether obstacles exist between the AP 1 and the remaining M−1 APs are obtained by performing the foregoing steps for M−1 times.

When the foregoing S510 to S530 are performed for the second time, the to-be-measured AP pairs are M−2 AP pairs formed by the AP 2 and remaining M−2 APs, where the result about whether an obstacle exists between the AP pair that is formed by the AP 1 and the AP 2 is obtained when the steps are performed for the first time. Determining results about whether obstacles exist between the AP 2 and the remaining M−2 APs are obtained by performing the foregoing steps for M−2 times.

When the foregoing S510 to S530 are performed for the $Q^{th}$ time, where Q≤M−1 and Q is a positive integer, the to-be-measured AP pairs are M−Q AP pairs formed by an AP Q and remaining M−Q APs. By performing the foregoing steps for M−Q times, determining results about whether obstacles exist between the AP Q and the remaining M−Q APs are obtained.

By analogy, when the foregoing S510 to S530 are performed for the $(M−1)^{th}$ time, there is only one AP pair formed by an AP M−1 and an AP M. By performing the foregoing steps once, a determining result about whether an obstacle exists between the AP M−1 and the AP M is obtained.

In conclusion, according to the obstacle recognition method provided in this application, the path loss value pairs between the terminal and the AP devices are obtained, to obtain the AP pair similar to the to-be-measured AP pair; the actual path loss value of the AP pair is obtained; the path loss value of the to-be-measured AP pair is inferred based on the path loss value of the similar AP pair; and the inferred path loss value of the to-be-measured AP pair is compared with the actual path loss value of the to-be-measured AP pair, to determine whether an obstacle exists between the to-be-measured AP pair. Accuracy of radio calibration can be improved based on the determining result about whether an obstacle exists between the AP pair.

Figure 2:
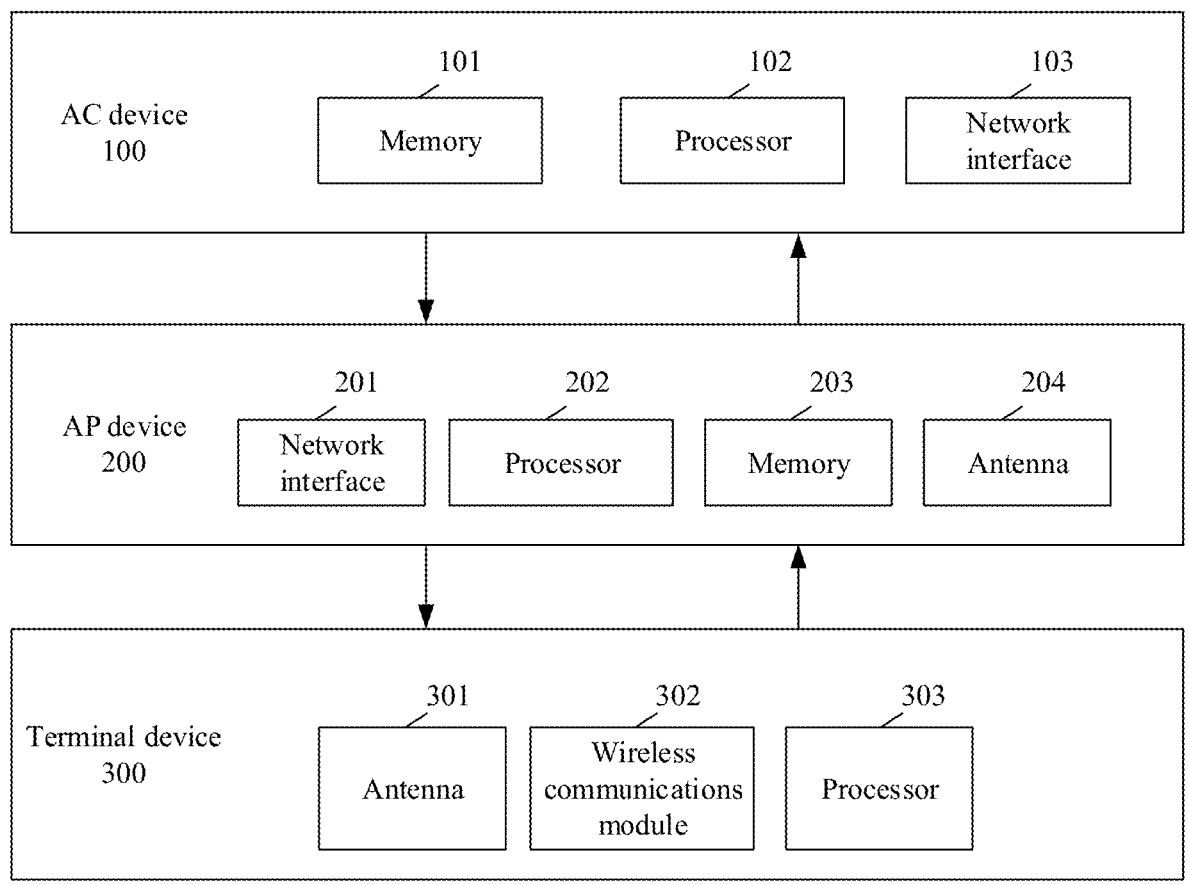
FIG. 2 is a schematic diagram of an architecture of a WLAN communications system according to an embodiment of this application.
Figure 6:
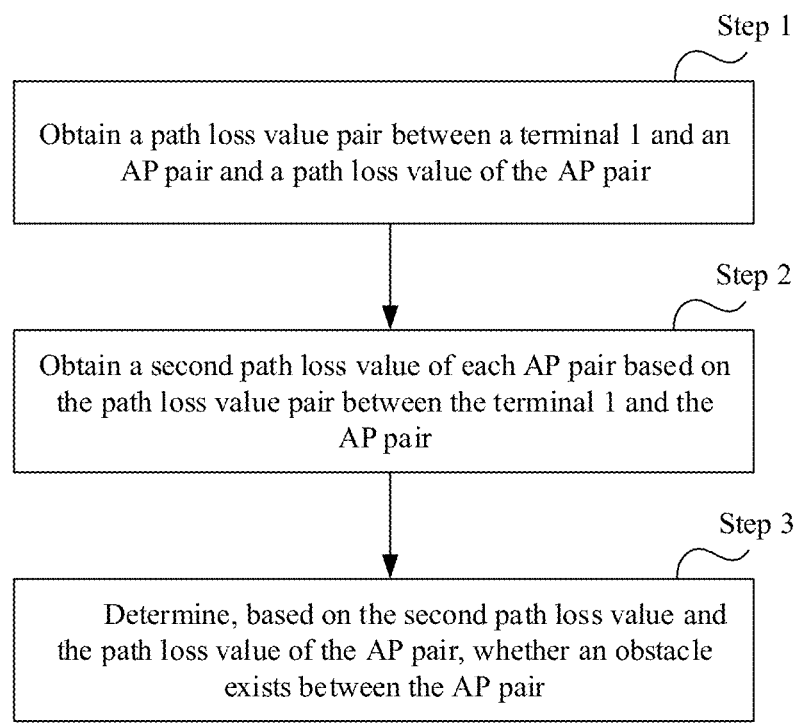
FIG. 6 is a schematic flowchart of an obstacle recognition method performed in an application scenario according to an embodiment of this application.

With reference to FIG. 2 and FIG. 6, the following describes, by using an example, an obstacle recognition method provided in this application. As shown in FIG. 1, an example in which the AP 1 to AP 5 are collectively managed by an AC 1 is used for description. As shown in FIG. 6, the obstacle recognition method includes the following steps.

Step 1. Obtain a path loss value pair between a terminal 1 and an AP pair and a path loss value of the AP pair.

The terminal 1 access the AP 1, and the AP 2 to AP 5 are neighbors of the AP 1. Therefore, 10 AP pairs are formed: (AP 1, AP 2), (AP 1, AP 3), (AP 1, AP 4), (AP 1, AP 5), (AP 2, AP 3), (AP 2, AP 4), (AP 2, AP 5), (AP 3, AP 4), (AP 3, AP 5), and (AP 4, AP 5).

Figure 7:
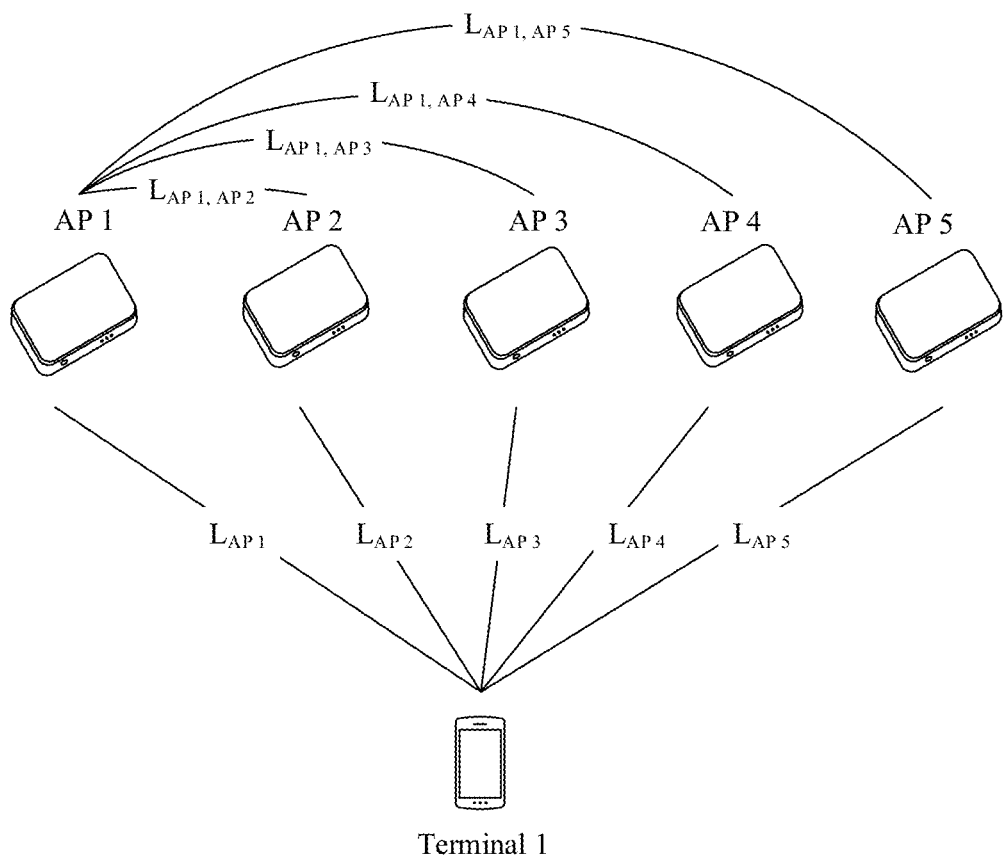
FIG. 7 is a schematic diagram of a path loss value between a terminal and an AP and a path loss value between APs according to an embodiment of this application.

First, the AC 1 obtains power information of the AP 1 to the AP 5 from a memory, which is $\{P_{AP\ 1}, P_{AP\ 2}, P_{AP\ 3}, P_{AP\ 4}, P_{AP\ 5}\}$ respectively. Then, each AP sends a detection signal, and the terminal 1 generates an RSSI that is between the terminal 1 and each AP based on a strength of a received signal, where each RSSI corresponds to a power value: $\{R_{AP\ 1}, R_{AP\ 2}, R_{AP\ 3}, R_{AP\ 4}, R_{AP\ 5}\}$. The power values corresponding to the RSSIs between the terminal 1 and the APs are sent to the AC 1. As shown in FIG. 7, the AC 1 obtains path loss values $\{L_{AP\ 1}, L_{AP\ 2}, L_{AP\ 3}, L_{AP\ 4}, L_{AP\ 5}\}$ between the terminal 1 and the APs. For example, $L_{AP\ 1}$ is a value obtained by performing division on the $P_{AP\ 1}$ and the $R_{AP\ 1}$. Then, path loss value pairs $\{[L_{AP\ 1}, L_{AP\ 2}], [L_{AP\ 1}, L_{AP\ 3}], [L_{AP\ 1}, L_{AP\ 4}], [L_{AP\ 1}, L_{AP\ 5}], [L_{AP\ 2}, L_{AP\ 3}], [L_{AP\ 2}, L_{AP\ 4}], [L_{AP\ 2}, L_{AP\ 5}], [L_{AP\ 3}, L_{AP\ 4}], [L_{AP\ 3}, L_{AP\ 5}], [L_{AP\ 4}, L_{AP\ 5}]\}$ between the terminal 1 and the 10 AP pairs are obtained based on the path loss values $\{L_{AP\ 1}, L_{AP\ 2}, L_{AP\ 3}, L_{AP\ 4}, L_{AP\ 5}\}$ between the terminal 1 and the APs.

The following describes a process of obtaining the path loss values of the AP pairs. Each AP device sends a signal, and other APs generate RSSI data based on a strength of a received signal. Then, RSSIs between the AP device and the other APs are obtained, and path loss values between the AP device and the other APs are further obtained, which are $\{L_{AP\ 1,\ AP\ 2}, L_{AP\ 1,\ AP\ 3}, L_{AP\ 1,\ AP\ 4}, L_{AP\ 1,\ AP\ 5}, L_{AP\ 2,\ AP\ 3}, L_{AP\ 2,\ AP\ 4}, L_{AP\ 2,\ AP\ 5}, L_{AP\ 3,\ AP\ 4}, L_{AP\ 3,\ AP\ 5}, L_{AP\ 4,\ AP\ 5}\}$.

With reference to FIG. 7 and by using the AP 1 as an example, the following describes how to obtain path loss values between the AP 1 and the other APs. The AP 1 sends a detection signal, and the other APs generate RSSI data based on a strength of a received signal, to obtain RSSIs between the AP 1 and the other APs, which are $\{R_{AP\ 1,\ AP\ 2}, R_{AP\ 1,\ AP\ 3}, R_{AP\ 1,\ AP\ 4}, R_{AP\ 1,\ AP\ 5}\}$. Further, the path loss values $\{L_{AP\ 1,\ AP\ 2}, L_{AP\ 1,\ AP\ 3}, L_{AP\ 1,\ AP\ 4}, L_{AP\ 1,\ AP\ 5}\}$ between the AP 1 and the other APs are obtained, where the path loss values between the AP 1 and the other APs are obtained by subtracting power values corresponding to the RSSIs between the AP 1 and the other APs from a power of the AP 1.

Step 2. Obtain a second path loss value of each AP pair based on the path loss value pair between the terminal 1 and the AP pair.

An AP pair in the 10 AP pairs is determined as a to-be-measured AP pair, where a path loss value of the to-be-measured AP pair is a first path loss value. Cosine distances between the terminal 1 and path loss value pairs of the other AP pairs and a cosine distance between the terminal 1 and a path loss value pair of the to-be-measured AP pair are calculated separately, to obtain an AP pair that is closest to the to-be-measured AP pair. A path loss value between the AP pair is used as a second path loss value of the to-be-measured AP pair.

For example, when the (AP 1, AP 2) is determined as the to-be-measured AP pair in the 10 AP pairs, a cosine distance between the path loss value pairs of the terminal 1 and the other AP pairs and the path loss value pair of the terminal 1 and the (AP 1, AP 2) is calculated. That is, distances between $[L_{AP\ 1}, L_{AP\ 3}], [L_{AP\ 1}, L_{AP\ 4}], [L_{AP\ 1}, L_{AP\ 5}], [L_{AP\ 2}, L_{AP\ 3}], [L_{AP\ 2}, L_{AP\ 4}], [L_{AP\ 2}, L_{AP\ 5}], [L_{AP\ 3}, L_{AP\ 4}], [L_{AP\ 3}, L_{AP\ 5}], [L_{AP\ 4}, L_{AP\ 5}]$ and $[L_{AP\ 1}, L_{AP\ 2}]$ are separately calculated, to obtain an AP pair that is closest to the to-be-measured AP pair. A path loss value between the AP pair is used as the second path loss value of the to-be-measured AP pair. For example, when the path loss value pair of the (AP 1, AP 2) is closest to the path loss value pair of the AP pair (AP 1, AP 3), the second path loss value of the (AP 1, AP 2) is the path loss value $L_{AP\ 1,\ AP\ 3}$ of the (AP 1, AP 3).

Step 3. Determine, based on the second path loss value and the path loss value of the AP pair, whether an obstacle exists between the AP pair.

If a preset threshold is a, it is determined, based on a difference between the second path loss value of the AP pair and the path loss value of the AP pair, whether an obstacle exists between the AP pair. If the difference is greater than a, it is considered that an obstacle exists between the AP pair; otherwise, no obstacle exists.

For example, to determine whether an obstacle exists between the AP 1 and the AP 2, a difference between the second path loss value $L_{AP\ 1,\ AP\ 3}$ and the path loss value $L_{AP\ 1,\ AP\ 2}$ of the AP 1 and the AP 2 needs to be compared.

If $L_{AP\ 1,\ AP\ 2}$ is greater than $L_{AP\ 1,\ AP\ 3}$, and $L_{AP\ 1,\ AP\ 2} - L_{AP\ 1,\ AP\ 3} \geq \alpha$, an obstacle exists between the AP 1 and the AP 2. If $L_{AP\ 1,\ AP\ 2}$ is less than $L_{AP\ 1,\ AP\ 3}$, no obstacle exists between the AP 1 and the AP 2. If $L_{AP\ 1,\ AP\ 2}$ is greater than $L_{AP\ 1,\ AP\ 3}$, and $L_{AP\ 1,\ AP\ 2} - L_{AP\ 1,\ AP\ 3} < \alpha$, no obstacle exists between the AP 1 and the AP 2.

In conclusion, according to the obstacle recognition method provided in this application, the path loss value pairs between the terminal 1 and the AP 1 to the AP 5 may be obtained, an AP pair similar to the to-be-measured AP pair may be obtained, and an actual path loss value of the AP pair may be obtained. Based on a path loss value of the similar AP pair, the path loss value of the to-be-measured AP pair is inferred. The inferred path loss value of the to-be-measured AP pair is compared with the actual path loss value of the to-be-measured AP pair, to determine whether an obstacle exists between the to-be-measured AP pair. Accuracy of radio calibration can be improved by determining whether an obstacle exists between the AP pair.

Figure 8:
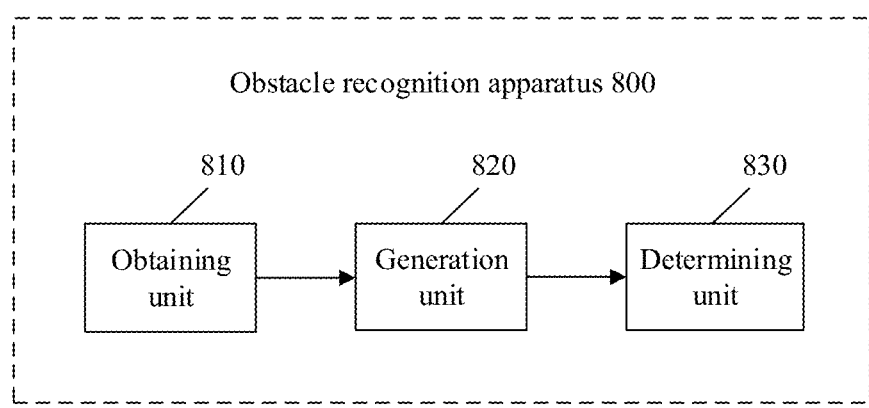
FIG. 8 is a schematic diagram of a structure of an obstacle recognition apparatus according to an embodiment of this application.

To resolve the problem that a radio calibration result is affected because of the inaccuracy of the obtained RS SI data, which is caused by the obstacle between the foregoing AP devices, this application provides an obstacle recognition apparatus 800, to effectively determine whether an obstacle exists between AP devices, to perform radio calibration more accurately. As shown in FIG. 8, the obstacle recognition apparatus 800 may include a determining unit 830.

The determining unit 830 is configured to determine, by comparing a first path loss value with a second path loss value between a first AP and a second AP, whether an obstacle exists between the first AP and the second AP. The first path loss value is a magnitude of a signal loss obtained through measurement between the first AP and the second AP. The second path loss value is a path loss value obtained by inferring based on a path loss value pair between a terminal and each AP pair in a plurality of AP pairs. Each AP pair in the plurality of AP pairs includes two APs. The plurality of AP pairs do not include an AP pair formed by the first AP and the second AP.

In some embodiments, the determining unit 830 is further configured to obtain a similar AP pair based on a similarity between a target path loss value pair and the path loss value pair that is between the terminal and each AP pair in the plurality of AP pairs. The target path loss value pair includes: a path loss value between a first terminal and the first AP, and a path loss value between the first terminal and the second AP. For each AP pair in the plurality of AP pairs, the path loss value pair between the terminal and the AP pair includes: a path loss value between a second terminal and one AP in the AP pair, and a path loss value between the second terminal and the other AP in the AP pair. The similar AP pair is an AP pair whose path loss value pair has a high similarity with the target path loss value pair in the plurality of AP pairs. The determining unit 830 is further configured to obtain the second path loss value based on the path loss value between the two APs of the similar AP pair.

In some embodiments, the determining unit 830 is further configured to: when the second path loss value is less than the first path loss value, and a difference between the second path loss value and the first path loss value is greater than a threshold, determine that an obstacle exists between the first AP and the second AP.

In some embodiments, the obstacle recognition apparatus 800 may include a generation unit 820, where the generation unit 820 is configured to compare a transmit power of the first AP with a strength of a signal of the first AP measured by the second AP, to obtain the first path loss value.

In some embodiments, the generation unit 820 is further configured to generate the path loss value pair between the terminal and the AP pair and the path loss value of the AP pair based on obtained powers of the plurality of APs, signal strengths between the terminal and the plurality of APs, and signal strengths between the plurality of AP pairs.

In some embodiments, the obstacle recognition apparatus 800 further includes an obtaining unit 810. The obtaining unit 810 is configured to obtain the powers of the plurality of APs, the signal strengths between the terminal and the plurality of APs, and the signal strengths between the plurality of AP pairs, where a strength of a measured signal may be an RSSI.

In conclusion, according to the obstacle recognition apparatus 800 provided in this application, the path loss value pairs between the terminal and the AP devices are obtained, to obtain the AP pair similar to the to-be-measured AP pair; the actual path loss value of the AP pair is obtained; the path loss value of the to-be-measured AP pair is inferred based on the path loss value of the similar AP pair; and the inferred path loss value of the to-be-measured AP pair is compared with the actual path loss value of the to-be-measured AP pair, to determine whether an obstacle exists between the to-be-measured AP pair. Accuracy of radio calibration can be improved based on the determining result about whether an obstacle exists between the AP pair.

The methods in the embodiments of this application are described in detail above. For ease of better implementing the solutions in the embodiments of this application, correspondingly related devices used to cooperate in implementing the solutions are further provided below.

Figure 9:
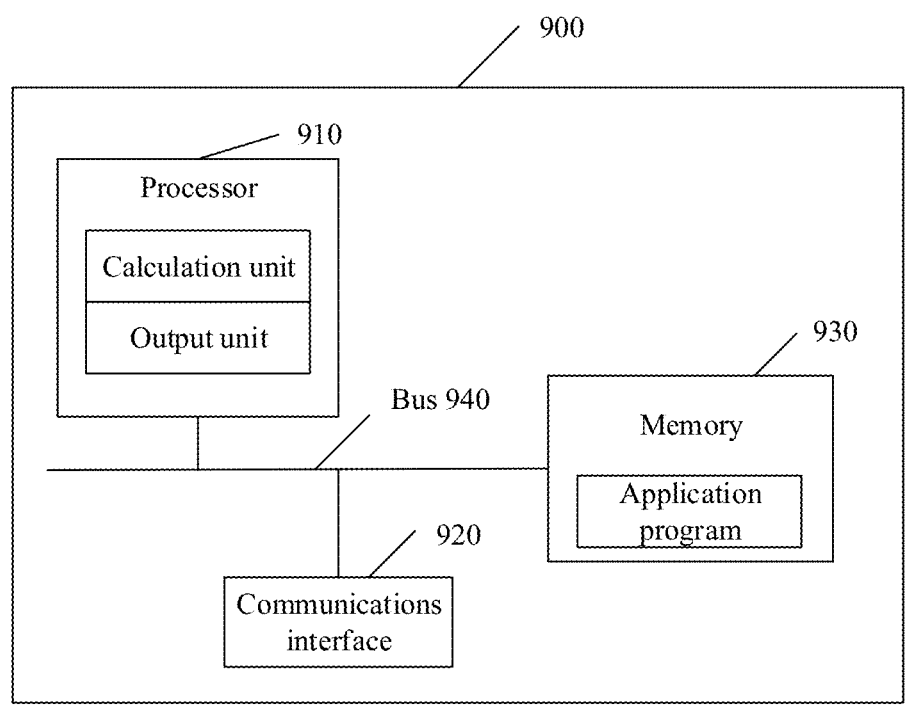
FIG. 9 is a schematic diagram of a structure of a computing device according to an embodiment of this application.

FIG. 9 is a schematic diagram of a structure of a computing device 900 according to this application. The computing device 900 may be the obstacle identification apparatus 800 in the foregoing description. As shown in FIG. 9, the computing device 900 includes: a processor 910, a communications interface 920, and a memory 930. The processor 910, the communications interface 920, and the memory 930 may be connected to each other by using an internal bus 940, or communication may be implemented in another manner, for example, wireless transmission. In this embodiment of this application, an example in which the foregoing components are connected by using the bus 940. The bus 940 may be a peripheral component interconnect (PCI) bus, an extended industry standard architecture (EISA) bus, or the like. The bus 940 may be classified into an address bus, a data bus, a control bus, and the like. For ease of representation, only one thick line is used to represent the bus in FIG. 9, but this does not mean that there is only one bus or only one type of bus.

The processor 910 may include at least one general-purpose processor, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or a combination thereof. The processor 910 executes various types of digital storage instructions, such as software or firmware programs stored in the memory 930, so that the computing device 900 provides various services.

The memory 930 is configured to store program code, and the processor 910 controls execution of the program code, to perform processing steps of the obstacle recognition method in the foregoing embodiment. The program code may include one or more software modules. The one or more software modules may be the software modules provided in the embodiment in FIG. 8, for example, an obtaining unit, a generation unit, and a determining unit. The obtaining unit is configured to obtain powers of a plurality of APs, signal strengths between a terminal and the plurality of APs, and signal strengths between a plurality of AP pairs. The generation unit is configured to generate a path loss value pair between the terminal and an AP pair and path loss value of the AP pair based on the obtained powers of the plurality of APs, the signal strengths between the terminal and the plurality of APs, and the signal strengths between the plurality of AP pairs. The determining unit is configured to compare a first path loss value with a second path loss value between a first AP and a second AP, to determine whether an obstacle exists between the first AP and the second AP. The first path loss value is a magnitude of a signal loss measured between the first AP and the second AP, and the second path loss value is a path loss value obtained by inferring based on a path loss value pair between the terminal and each AP pair in the plurality of AP pairs.

It should be noted that this embodiment may be implemented by a general-purpose physical server, for example, an ARM server or an X86 server, or may be implemented by a virtual machine that is implemented based on a general-purpose physical server in combination with an NFV technology. A virtual machine is a software-implemented complete computer system that has a function of a complete hardware system and operates in a fully isolated environment. This is not specifically limited in this application.

The memory 930 may include a volatile memory, such as a random access memory (RAM); or the memory 930 may include a non-volatile memory, such as a read-only memory (ROM), a flash memory, a hard disk drive (HDD), or a solid state drive (SSD); or the memory 930 may include a combination of the foregoing types of memories. The memory 930 may store program code, and specifically perform S510 to S530 and optional steps in the embodiment in FIG. 5. Details are not described herein again.

The communications interface 920 may be a wired interface (for example, an Ethernet interface), an internal interface (for example, a high-speed serial computer extended bus (Peripheral Component Interconnect express, PCIe) interface), or a wireless interface (for example, a cellular network interface or a wireless local area network interface). The communications interface 920 is configured to communicate with another device or module.

It should be noted that FIG. 9 is merely a possible implementation of this embodiment of this application. In actual application, the computing device 900 may alternatively include more or fewer components. This is not limited herein. For content that is not shown or not described in embodiments of this application, refer to related descriptions in the embodiment of FIG. 5. Details are not described herein again.

It should be understood that the computing device shown in FIG. 9 may alternatively be a computer cluster including at least one server. This is not specifically limited in this application.

An embodiment of this application further provides a computer-readable storage medium. The computer-readable storage medium stores instructions. When the instructions are run on a processor, the method procedure shown in FIG. 5 is implemented.

An embodiment of this application further provides a computer program product. When the computer program product is run on a processor, the method procedure shown in FIG. 5 is implemented.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions. When the computer program instructions are loaded or executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (DVD)), or a semiconductor medium. The semiconductor medium may be an SSD.

The foregoing descriptions are merely specific implementations of the present invention, but are not intended to limit the protection scope of the present invention. Any equivalent modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An obstacle recognition method, comprising:
    comparing a first path loss value with a second path loss value between a first access point (AP) and a second AP, to determine whether an obstacle exists between the first AP and the second AP, wherein the first path loss value is a magnitude of a signal loss obtained through measurement between the first AP and the second AP, the second path loss value is a path loss value inferred based on a path loss value pair between a terminal and each AP pair in a plurality of AP pairs, each AP pair in the plurality of AP pairs comprises two APs, and the plurality of AP pairs do not comprise an AP pair formed by the first AP and the second AP.

2. The method according to claim 1, wherein before comparing the first path loss value with the second path loss value between the first AP and the second AP, the method further comprises:
    obtaining a similar AP pair based on a similarity between a target path loss value pair and the path loss value pair that is between the terminal and each AP pair in the plurality of AP pairs, wherein the target path loss value pair comprises: a path loss value between a first terminal and the first AP, and a path loss value between the first terminal and the second AP; for each AP pair in the plurality of AP pairs, the path loss value pair between the terminal and the AP pair comprises: a path loss value between a second terminal and one AP in the AP pair, and a path loss value between the second terminal and the other AP in the AP pair; and the similar AP pair is an AP pair whose path loss value pair has a high similarity with the target path loss value pair in the plurality of AP pairs; and obtaining the second path loss value based on a path loss value between two APs in the similar AP pair.

3. The method according to claim 1, wherein after comparing the first path loss value with the second path loss value between the first AP and the second AP, the method further comprises:

if the second path loss value is less than the first path loss value, and a difference between the second path loss value and the first path loss value is greater than a threshold, determining that the obstacle exists between the first AP and the second AP.

4. The method according to claim 1, wherein before comparing the first path loss value with the second path loss value between the first AP and the second AP, the method further comprises:

comparing a transmission power of the first AP with a signal strength of the first AP measured by the second AP, to obtain the first path loss value.

5. A computing system, comprising a processor and a memory, wherein the memory is configured to store instructions, and the processor is configured to execute the instructions; and when the processor executes the instructions, the processor performs the method according to claim 1.

6. A computer program product, wherein the computer program product comprises computer instructions stored in non-volatile memory; when the computer program product is run on a computing device, the computing device performs the method according to claim 1.

7. The method according to claim 1, wherein before comparing the first path loss value with the second path loss value between the first AP and the second AP, the method further comprises:

determining a similar AP pair by calculating similarities between a target path loss value pair and path loss value pairs of other AP pairs, wherein the target path loss value pair is a path loss value pair between the terminal and each of the first AP and the second AP, and wherein the path loss value pairs of the other AP pairs are between the terminal and each other AP pair in the plurality of AP pairs.

* * * * *